(12) United States Patent
MacLachlan

(10) Patent No.: US 10,947,058 B2
(45) Date of Patent: Mar. 16, 2021

(54) MODULAR CONVEYOR BELT INTEGRATING LANE DIVIDERS

(71) Applicant: Laitram, L.L.C., Harahan, LA (US)

(72) Inventor: Gilbert J. MacLachlan, Harahan, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 16/629,394

(22) PCT Filed: Jul. 11, 2018

(86) PCT No.: PCT/US2018/041577
§ 371 (c)(1),
(2) Date: Jan. 8, 2020

(87) PCT Pub. No.: WO2019/018172
PCT Pub. Date: Jan. 24, 2019

(65) Prior Publication Data
US 2020/0140206 A1    May 7, 2020

Related U.S. Application Data

(60) Provisional application No. 62/534,338, filed on Jul. 19, 2017.

(51) Int. Cl.
| | | |
|---|---|---|
| *B65G 17/08* | (2006.01) | |
| *B65G 17/06* | (2006.01) | |
| *B65G 15/42* | (2006.01) | |
| *B65G 15/30* | (2006.01) | |
| *B65G 47/28* | (2006.01) | |
| *B65G 17/46* | (2006.01) | |

(52) U.S. Cl.
CPC .......... *B65G 47/28* (2013.01); *B65G 17/062* (2013.01); *B65G 17/46* (2013.01); *B65G 2207/30* (2013.01); *B65G 2811/0615* (2013.01)

(58) Field of Classification Search
None
See application file for complete search history.

(56) References Cited

U.S. PATENT DOCUMENTS

| | | | |
|---|---|---|---|
| 3,967,358 A | 7/1976 | Orlando | |
| 6,079,543 A | 6/2000 | Palmaer | |
| 6,471,041 B1 * | 10/2002 | Long .................. | B65G 17/42 198/699.1 |
| 7,494,006 B2 | 2/2009 | Knott et al. | |
| 9,994,396 B1 | 6/2018 | Maine, Jr. et al. | |
| 2004/0020749 A1 * | 2/2004 | Wood .................. | B65G 21/18 198/778 |
| 2007/0261943 A1 | 11/2007 | Elsner | |
| 2008/0023305 A1 | 1/2008 | Wild et al. | |

* cited by examiner

*Primary Examiner* — Kavel Singh
(74) *Attorney, Agent, or Firm* — Catherine M. Bishop

(57) ABSTRACT

A conveyor system integrates lane dividers to form a plurality of product lanes across a conveyor belt carryway while providing conduits enabling transverse fluid flow across the carryway. Each lane divider includes a body defining edges of adjacent conveyor belt lanes and hinge elements or other attachment means for integrating the lane divider into a modular conveyor belt. The body has lateral conduits to allow transverse fluid flow therethrough.

18 Claims, 7 Drawing Sheets

MODULAR CONVEYOR BELT INTEGRATING LANE DIVIDERS

BACKGROUND

The invention relates generally to power-driven conveyors and more particularly to modular plastic conveyor belts.

Modular plastic conveyor belts are widely used in various industries to convey products. Modular plastic conveyor belts are constructed of a series of rows of belt modules. Hinge eyes along opposite ends of each row interleave with hinge eyes of consecutive rows. A hinge rod inserted in the interleaved hinge eyes connects the rows together at hinge joints into an endless conveyor belt loop. In addition, some conveyor belts integrate accessories, such as lane dividers and hold-down tabs.

SUMMARY

A conveyor system integrates lane dividers to form a plurality of product lanes across a conveyor belt carryway while providing conduits enabling transverse fluid flow across the carryway. Each lane divider includes a body defining edges of adjacent conveyor belt lanes and hinge elements or other attachment means for integrating the lane divider into a modular conveyor belt. The body has lateral conduits to allow transverse fluid flow therethrough.

According to one aspect, a lane divider for a conveyor belt comprises a body extending from a front edge to a rear edge, the body including at least one transverse opening to allow fluid flow therethrough, a first hinge element extending downwards and forward from the front edge of the body for connecting the lane divider to a conveyor belt module and a second hinge element extending downwards and rearward from the rear edge of the body for connecting the lane divider to a conveyor belt module.

According to another aspect, a conveyor belt module suitable for forming a conveyor belt having a plurality of lanes, comprising a base module and a lane divider coupled to the base module using a hinge rod. The base module comprises a body, a plurality of first hinge elements extending from the front edge of the body and a plurality of second hinge elements extending from a rear edge of the body. The lane divider comprises a body extending from a front edge to a rear edge, the body including at least one transverse opening to allow fluid flow therethrough, and a hinge element extending from the body for connecting the lane divider to the base module. The lane divider hinge element is aligned with and inserted between two of the first hinge elements.

According to another embodiment, a battery formation table comprises a conveyor belt, a tank surrounding the conveyor belt and a plurality of lane dividers connected to the conveyor belt to divide the carryway into a plurality of lanes. The conveyor belt comprises a plurality of hingedly connected conveyor belt modules forming a circuit comprising a carryway extending from an infeed to an outfeed and a returnway below the carryway. The carryway can be submerged in a cooling fluid. Each lane divider includes a hinge element extending from a body for connecting the lane divider to the conveyor belt and a transverse opening through the body for allowing transverse fluid flow.

BRIEF DESCRIPTION OF THE DRAWINGS

These aspects and features of the invention, as well as its advantages, are described in more detail in the following description, appended claims, and accompanying drawings, in which:

DETAILED DESCRIPTION

A conveyor belt integrates lane dividers to divide a conveying surface into a plurality of lanes to constrain conveyed products while allowing transverse fluid flow through the lane dividers. The invention will be described relative to certain illustrative embodiments, though one skilled in the art will recognize that the invention is not limited to these illustrative embodiments.

Figure 1:
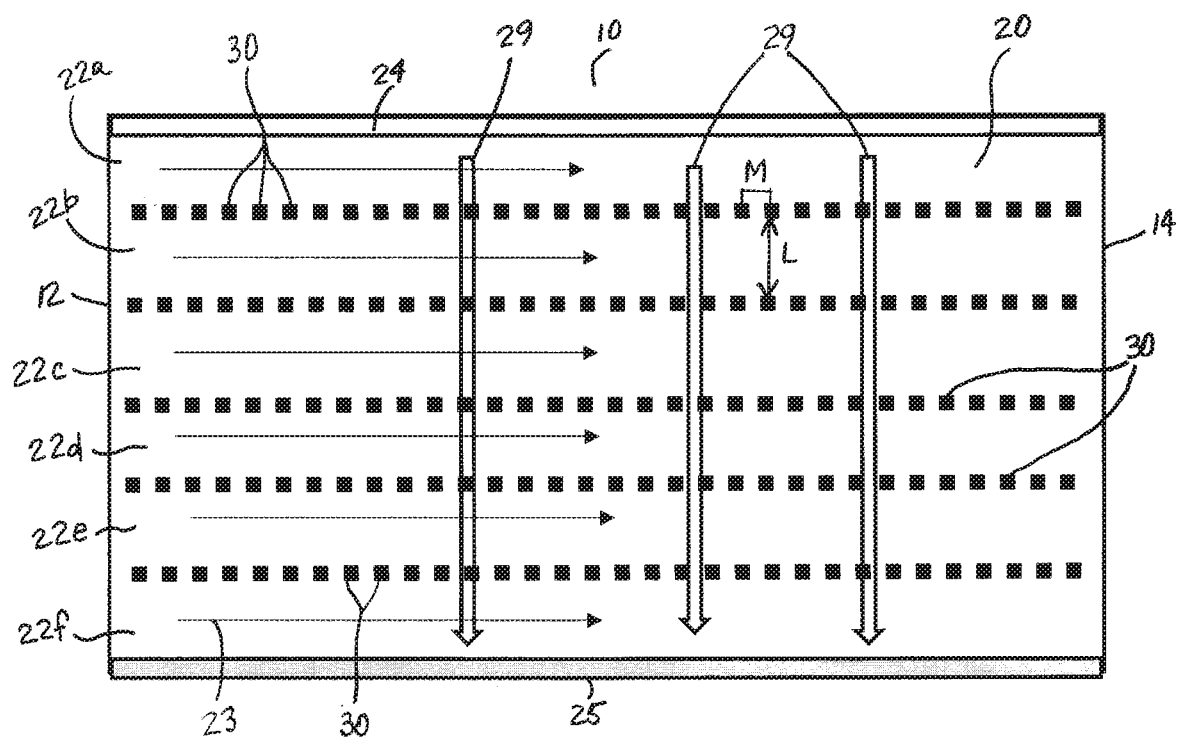
FIG. 1 is an overhead schematic view of a conveyor system employing lane dividers according to an embodiment of the invention.

Referring to FIG. 1, a conveyor system 10 comprises a conveyor belt 20 trained around and driven by one or more drive sprockets or other suitable guides. The conveyor belt 20 is in the form of a circuit with an upper conveying portion, forming a carryway for conveying product, and a lower returnway portion below and generally parallel to the conveying portion. The carryway extends from an infeed 12 to an outfeed 14. The illustrative conveyor system is a formation table used to charge batteries, though the invention is not so limited. The formation table comprises a water-filled, open top tank that conveys batteries through the tank. The carryway of the conveyor belt 20 is submerged to bathe the batteries in water or other cooling fluid during conveyance, but the invention is not so limited.

The illustrative carryway is divided into a plurality of lanes 22a-f to divide and separate product being conveyed through the system from the infeed 12 to the outfeed 14 in the direction of the conveying arrows 23. The illustrative lanes are formed by side guards 24, 25 at each side of the conveyor belt 20 and lane dividers 30 coupled to modules forming the conveyor belt to form the lanes. Preferably, the lane dividers 30 are formed of or include an abrasion resistant material, such as propylene, or any other suitable material.

The illustrative lane dividers 30 serve as lane dividers as well as transverse flow conduits. The lane dividers 30 have a selected height, width and spacing to prevent batteries from touching during formation and maintain a desired orientation of the batteries during conveyance through the formation table. In certain applications, such as the formation of absorbent glass mat (AGM) batteries, transverse flow of cooling fluid across the conveyor belt is important or desirable. The illustrative lane dividers 30 contain the product on the belt while allowing for transverse fluid flow, indicated in part by transverse arrows 29, to facilitate cooling. Transverse flow may occur in both directions.

In the illustrative embodiment, the conveyor belt is a modular plastic conveyor belt formed of hingedly connected conveyor belt modules. The illustrative lane dividers 30 are inserted every other row, providing about a one-module length space M between each successive lane divider. The lane dividers 30 are spaced laterally by a suitable distance L to form a lane 22 of a desired width suitable for containing battery or other conveyed product. The lane dividers 30 have selected widths to provide sufficient separation of product between lanes.

Figure 2:
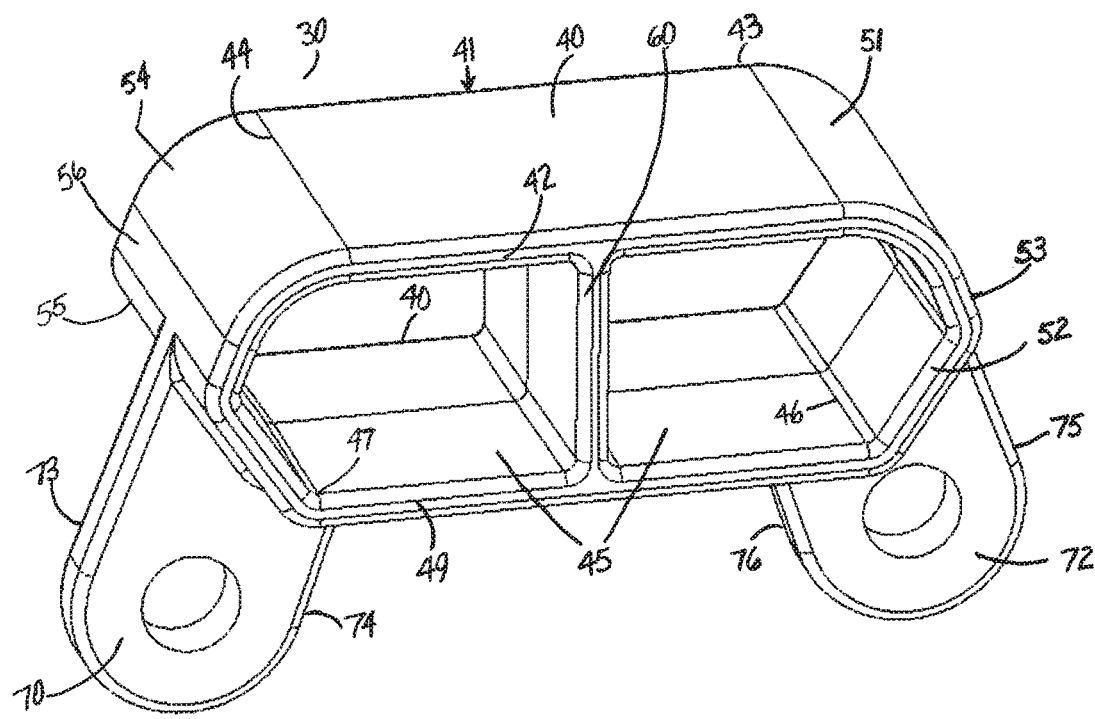
FIG. 2 is an isometric view of a lane divider suitable for use in the conveyor system of FIG. 1.
Figure 3:
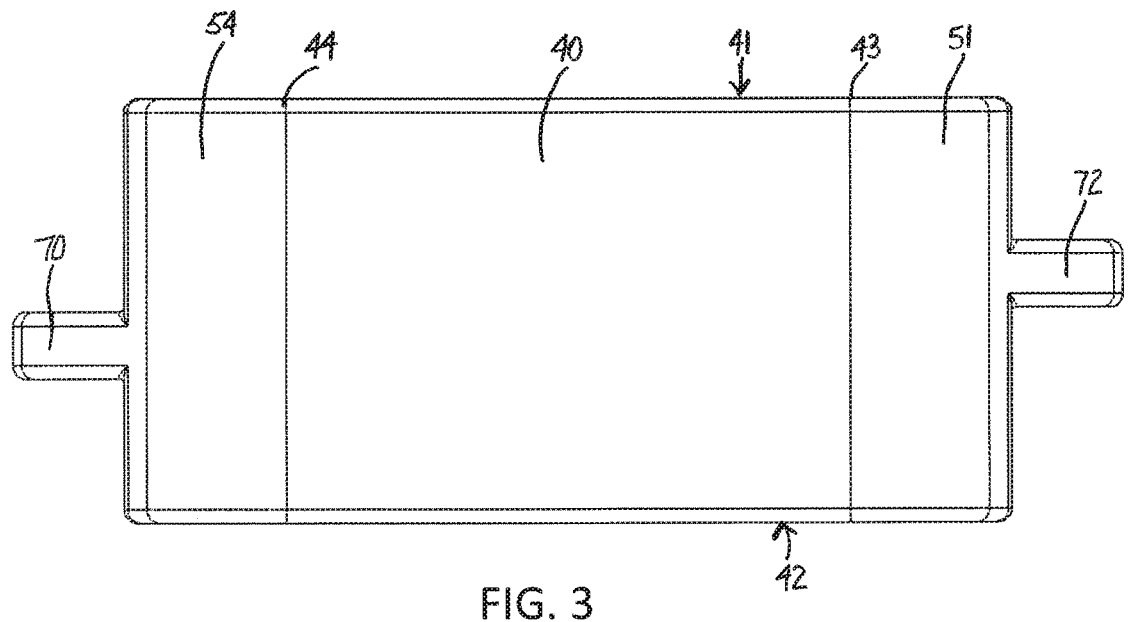
FIG. 3 is a top view of the lane divider of FIG. 2.
Figure 4:
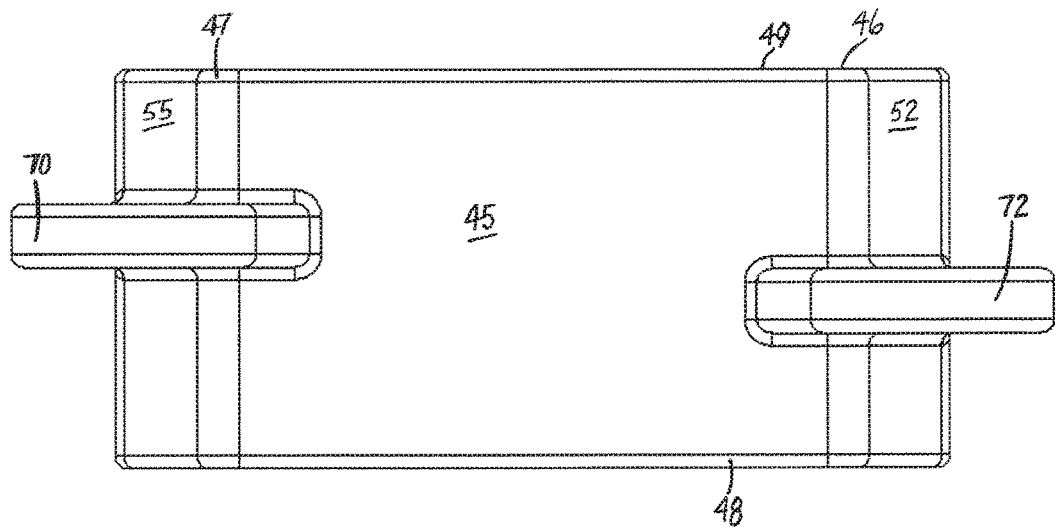
FIG. 4 is a bottom view of the lane divider of FIG. 2.
Figure 5:
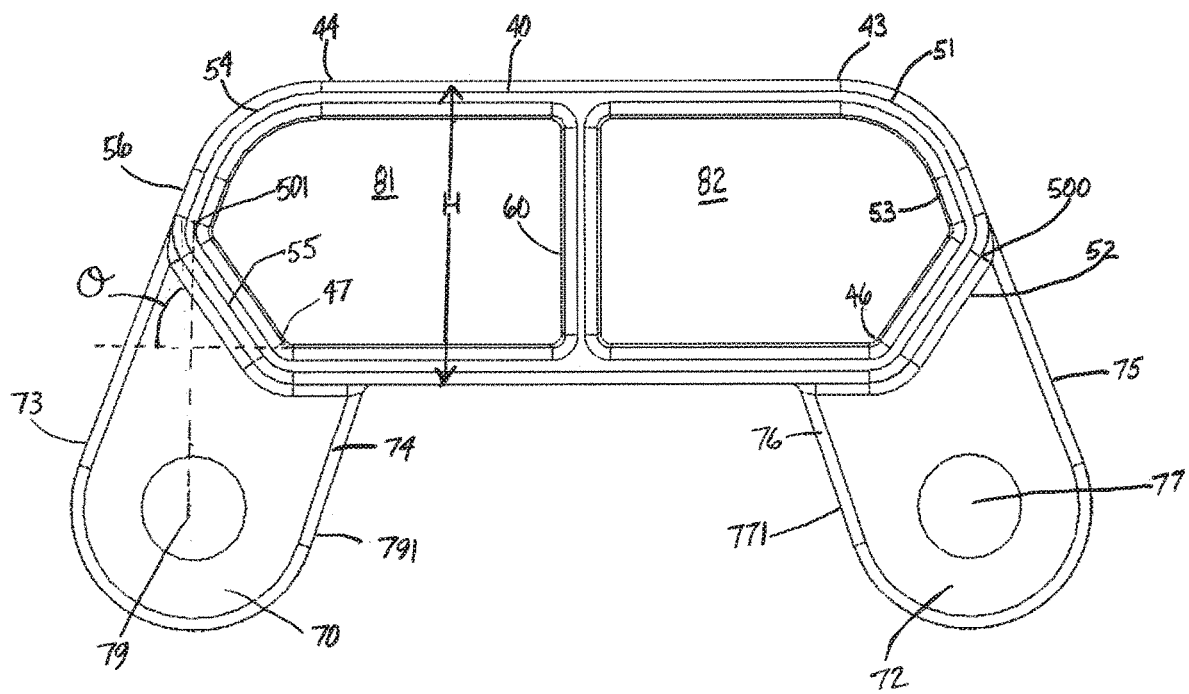
FIG. 5 is a side view of the lane divider of FIG. 2.
Figure 6:
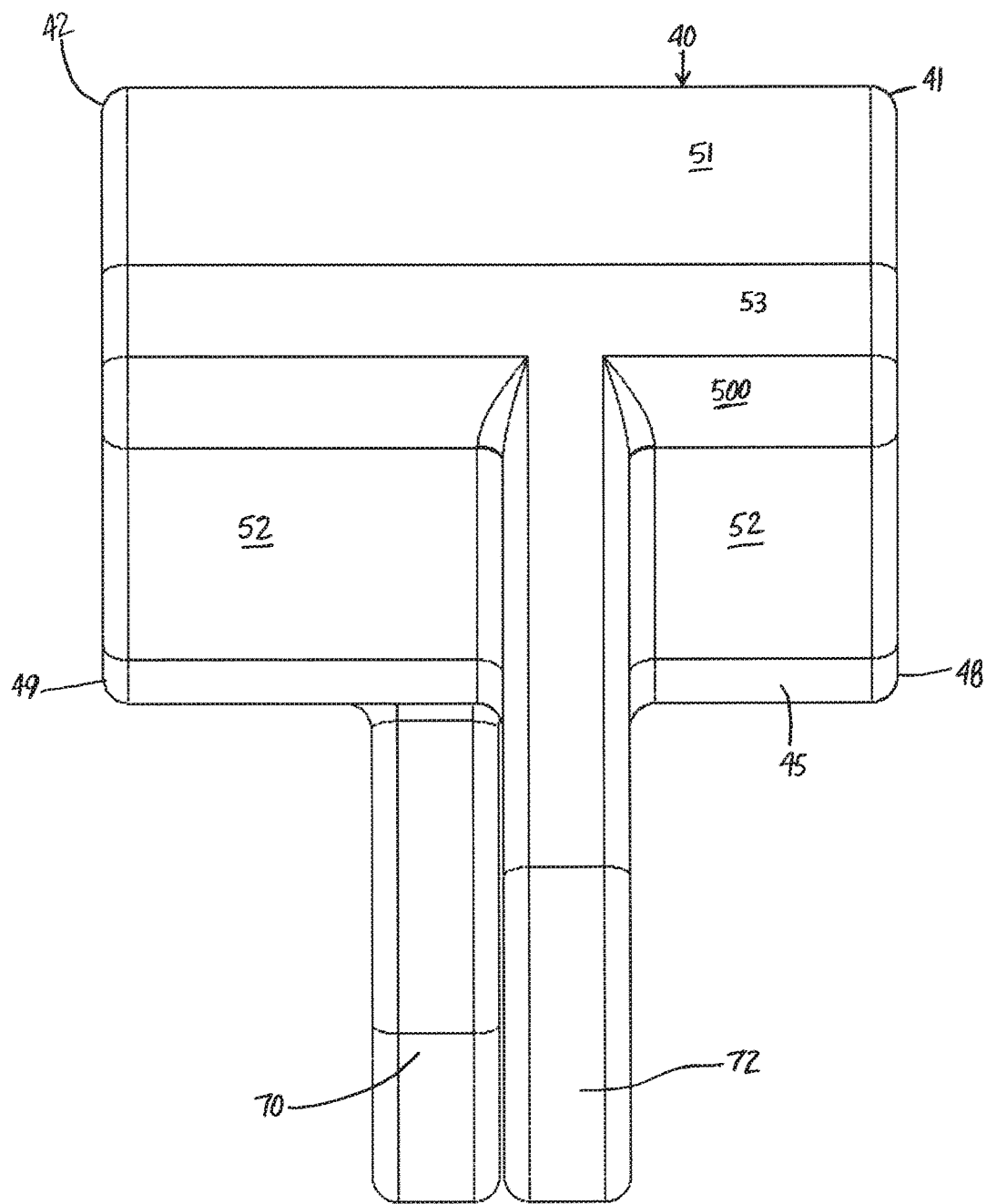
FIG. 6 is a front view of the lane divider of FIG. 2.

FIG. 2 is an isometric view of a lane divider 30 suitable for forming lanes in a conveyor while allowing transverse fluid flow in a battery formation table or other suitable application according to an embodiment of the invention. FIG. 3 is a top view of the lane divider 30. FIG. 4 is a bottom view of the lane divider 30. FIG. 5 is a side view of the lane divider 30. FIG. 6 is a front view of the lane divider 30. The lane divider 30 includes a body portion forming both a barrier to constrain conveyed products and a conduit for transverse fluid flow. The lane divider 30 further includes attachment means, shown as hinge elements 70, 72 for coupling the lane divider 30 to a conveyor belt module.

The lane divider body comprises a top wall 40 extending longitudinally from a front edge 43 to a rear edge 44 and laterally from a first side edge 41 to a second side edge 42. The illustrative top wall 40 is substantially rectangular in shape, longer in the longitudinal direction. In one embodiment, the top wall 40 is between about 0.5" and about 2.0" and preferably about 1.0" in lateral width, sufficient to prevent adjacent batteries in adjacent conveying lanes from touching during formation.

The lane divider body has an asymmetric front wall, comprising a first top curved wall 51 extending forward and down from the top wall front edge 43, transitioning to a forwardly angled wall 53, which transitions to a lower angled wall 52 that angles inward towards a bottom wall 45 that sits on top of the underlying conveyor belt. The transition 500 between angled walls 52 and 53 is about halfway vertically between the top wall 40 and bottom wall 45 and forms the front edge of the lane divider body.

The bottom wall 45 extends longitudinally from a front edge 46 to a rear edge 47 and laterally from a first side edge 48 aligned with the top wall side edge 41 to a second side edge 49 aligned with top wall side edge 42. The illustrative bottom wall 45 is slightly longer than the top wall 40, though about equal in width, though the invention is not so limited.

The lane divider body includes a rear wall mirroring the front wall, including a top curved wall 54 extending downwards and rearwards from the top wall rear edge 44, rearward angled wall 56, inflection point 501 forming the rear edge of the lane divider body, and a lower angled wall 55 that angles inward towards the bottom wall 45 and intersects the bottom wall 45 at rear edge 47.

The illustrative lower angled walls 52 and 55 extend at an angle Θ that is between about 50° and about 60° from horizontal to allow backbend of the associated conveyor belt, which may facilitate assembly of the conveyor belt, though the invention is not so limited.

The illustrative top wall 40 and bottom wall 45 are flat, though could alternatively be perforated or include other features to facilitate vertical fluid flow, and-or include channels or other features to facilitate transverse fluid flow.

The lane divider body further includes a central reinforcing wall 60 extending between the top wall 40 and bottom wall 45, to form two conduits 81, 82 between the side edges to allow fluid flow through the lane divider body. The central reinforcing wall 60 may be shaped to promote fluid flow through the body.

The illustrative lane divider body has a height H between the bottom of the bottom wall 45 and the top of the top wall 40 that is between about 10 mm and about 30 mm and preferably about 20 mm, though the invention is not so limited. The illustrative height facilitates transfer and moving of the associated conveyor belt while ensuring sufficient height to constrain product in the lanes 22.

Front hinge element 70 extends forward and downward from the lane divider body and rear hinge element 72 extends rearward and downward from the hinge element body. The illustrative hinge elements 70, 72 are offset from each other and configured to align with hinge elements of an associated conveyor belt module to attach the lane divider 30 to the conveyor belt module using a hinge rod.

The front hinge element 72 extends parallel to front angled wall 53 of the lane divider body, with the hinge element front (outer) wall 75 extending from and aligned with angled wall 53 and rear (inner) wall 76 parallel to front wall 75 and angled wall 53 and extending from bottom wall 45. Front hinge element 72 has a hinge opening 77 configured to receive a hinge rod and align with hinge openings in an associated conveyor belt module.

The rear hinge element 70 extends parallel to rear angled wall 56 of the lane divider body, with the hinge element rear (outer) wall 73 extending from and aligned with angled wall 56 and forward (inner) wall 74 parallel to rear (outer) wall 73 and angled wall 56 and extending from bottom wall 45. Rear hinge element 70 has a hinge opening 79 configured to receive a hinge rod and align with hinge openings in an associated conveyor belt module.

The illustrative hinge openings 77, 79 are centered below the transition points 500, 501, but the invention is not so limited. In addition, the front edge 43 of the top wall 40 may be directly above the rear point 771 of the hinge element 72 that is aligned with the center of hinge opening 77. Similarly, the rear edge 44 of the top way may be directly above the front point 791 of the hinge element 70 at the height of the center of the hinge opening 79.

Figure 7:
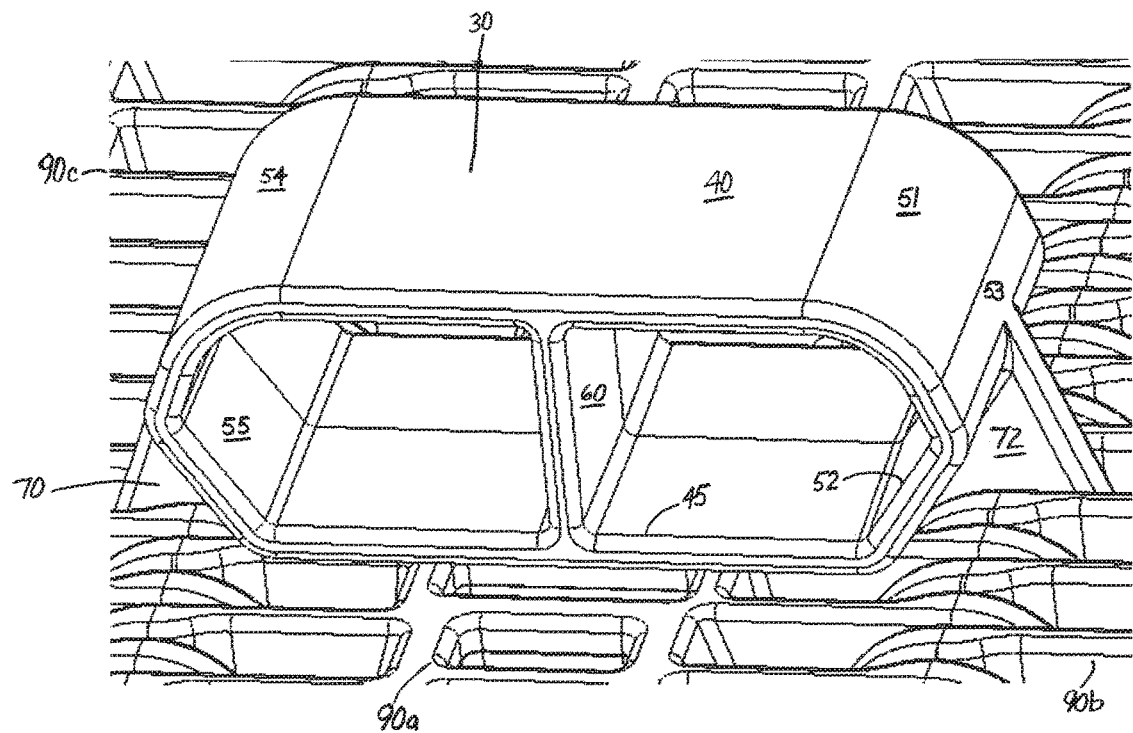
FIG. 7 is an isometric view of the lane divider of FIG. 2 integrated with a modular conveyor belt according to an embodiment of the invention.
Figure 8:
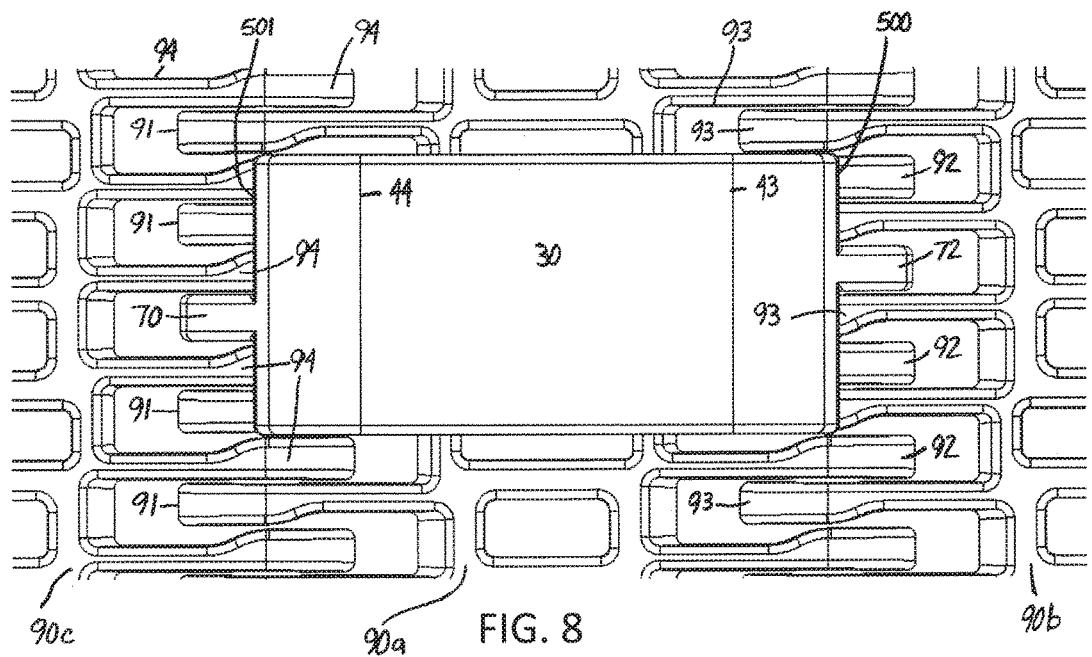
FIG. 8 is a top view of the embodiment of FIG. 7.
Figure 9:
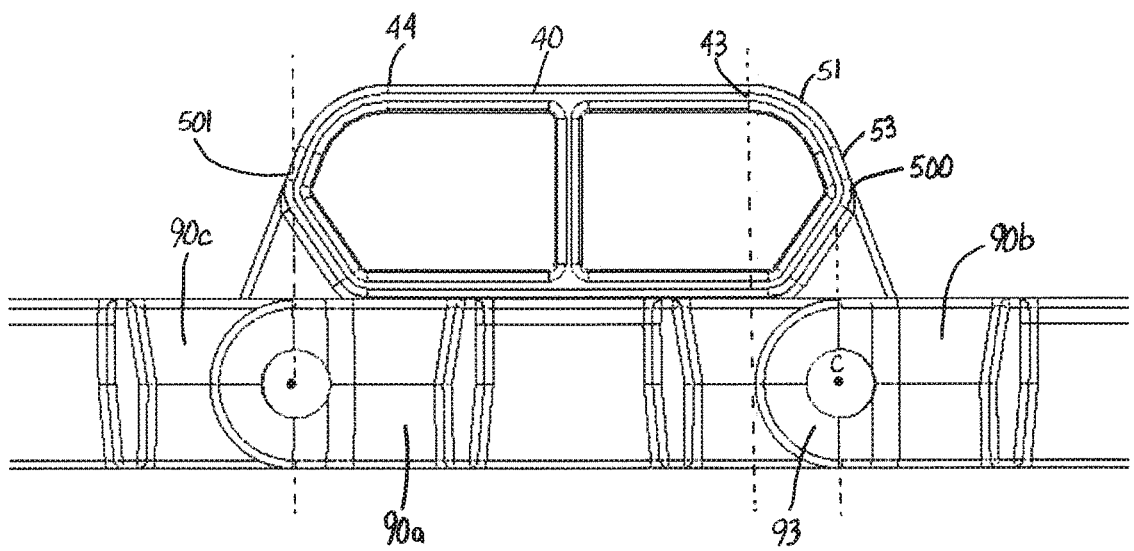
FIG. 9 is a side view of the embodiment of FIG. 7.

Referring to FIGS. 7-9, a lane divider 30 can be integrated with a conveyor belt comprising a plurality of hingedly connected modules 90 using a first hinge rod extending through aligned hinge elements 72, 92 and 93 and a second hinge rod extending through aligned hinge elements 70, 91 and 94. The illustrative body of the lane divider 30 (width of top wall 40) spans at least three of the hinge elements of a module 90 in the conveyor belt, but the invention is not so limited.

To accommodate the lane divider 30, a hinge element is removed or omitted from the front and rear edges of the underlying module 90*a* below the lane divider location, with hinge elements 70 and 72 replacing the omitted hinge elements while maintaining the spacing of the hinge elements in the resulting conveyor belt.

In one embodiment, the front edge 43 of the top wall 40 substantially aligns with the rear of hinge elements 93 of a forward conveyor belt module 90*b*, as shown in FIG. 9. The rear edge 44 of the top wall 40 substantially aligns with the front of hinge elements 94 of a rear conveyor belt module 90*b*. The frontmost point (front edge 500) and rearmost point (rear edge 501) of the lane divider body is above the hinge element opening in the illustrative embodiment, so that the lane divider body spans the length of the underlying conveyor belt module 90*a*.

Figure 10:
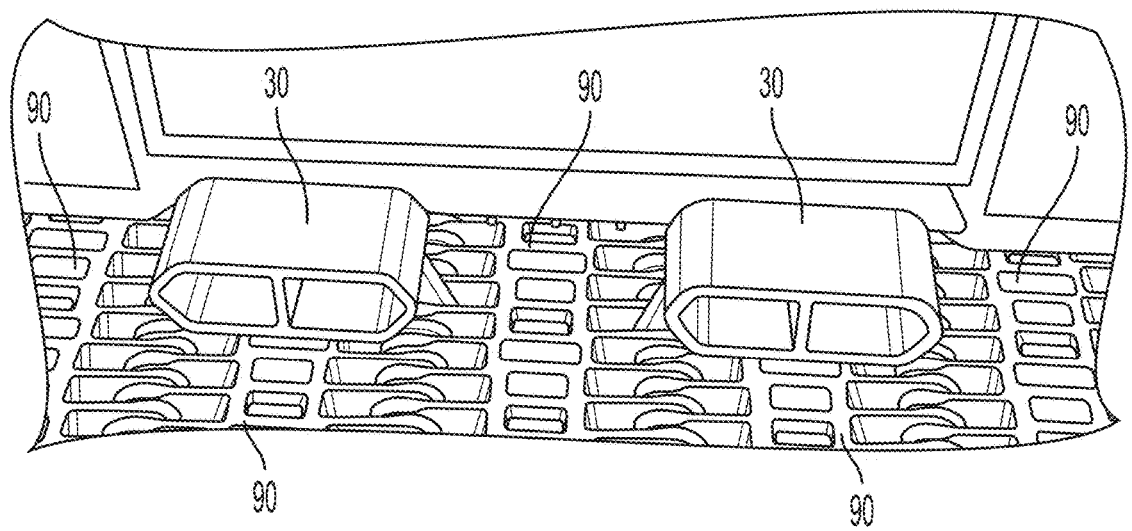
FIG. 10 is an isometric view of a plurality of lane dividers integrated with a modular conveyor belt according to an embodiment of the invention.

As shown in FIG. 10, a lane divider 30 with transverse fluid conduits forming one wall of a lane may be placed every other module row.

Figure 11:
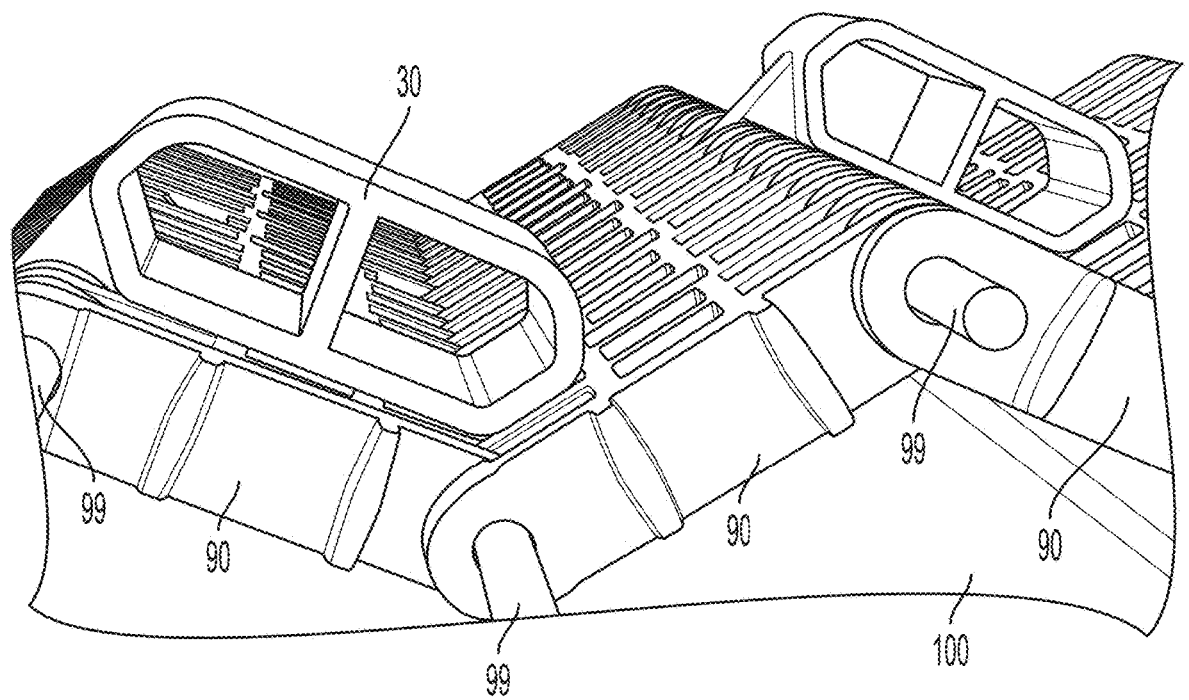
FIG. 11 shows the conveyor belt of FIG. 10 during assembly on a corrugated platen.

Referring to FIG. 11, the illustrative front 52 and rear 55 walls of the body of the lane divider 30 allow backbend between adjacent modules 90 connected using hinge rods 99 (which also connect the lane divider 30 to an underlying module), which facilitates assembly of the conveyor belt on a corrugated platen 100.

Although the invention has been described in detail with respect to an exemplary version, other versions are possible. So, as these few examples suggest, the scope of the claims is not meant to be limited to the exemplary embodiments described in detail.

What is claimed is:

1. A lane divider for a conveyor belt comprising:
    a body comprising a top wall extending from a top wall front edge to a top wall rear edge, a bottom wall that is longer than the top wall and extends from a bottom wall front edge to a bottom wall rear edge, a front wall extending from the top wall front edge to the bottom wall front edge and a rear wall extending between the top wall rear edge and the bottom wall rear edge, the body including at least one transverse opening to allow fluid flow therethrough;
    a first hinge element extending downwards and forward from the front edge of the body for connecting the lane divider to a conveyor belt module; and
    a second hinge element extending downwards and rearward from the rear edge of the body for connecting the lane divider to a conveyor belt module.

2. The lane divider of claim 1, wherein the body further comprises a reinforcing wall extending between the top wall and bottom wall to form at least two transverse openings through the lane divider body.

3. The lane divider of claim 1, wherein the front wall comprises a first top curved wall extending forward and down from the top wall front edge, the first top curved wall transitioning to a forwardly angled wall, the forwardly angled wall transitioning to a lower angled wall that angles inward towards the bottom wall.

4. The lane divider of claim 3, wherein the transition between the forwardly angled wall and the lower angled wall forms the front edge of the lane divider body.

5. The lane divider of claim 4, wherein the front edge of the lane divider body is centered vertically between the top wall and the bottom wall.

6. The lane divider of claim 3, wherein the rear wall mirrors the front wall.

7. The lane divider of claim 3, wherein the first hinge element extends parallel to the forwardly angled wall of the front wall.

8. The lane divider of claim 1, wherein the front edge of the body is above a hinge opening in the first hinge element and the rear edge of the body is above a hinge opening in the second hinge element.

9. A conveyor belt module suitable for forming a conveyor belt having a plurality of lanes, comprising:
    a base module comprising a body, a plurality of first hinge elements extending from the front edge of the body and a plurality of second hinge elements extending from a rear edge of the body; and
    a lane divider coupled to the base module using a hinge rod, the lane divider comprising a body having a top wall extending from a top wall front edge to a top wall rear edge, a bottom wall extending from a bottom wall front edge to a bottom wall rear edge, a front wall comprising a first top curved wall extending from the top wall front edge and transitioning to a forwardly angled wall, the forwardly angled wall transitioning to a lower angled wall that angles inward to the bottom wall front edge and a rear wall extending between the top wall rear edge and the bottom wall rear edge, the body including at least one transverse opening to allow fluid flow therethrough, and a hinge element extending from the body for connecting the lane divider to the base module, the lane divider hinge element aligned with and inserted between two of the first hinge elements.

10. The conveyor belt module of claim 9, wherein the lane divider front edge is aligned with openings in the first hinge elements and the lane divider hinge element.

11. The conveyor belt module of claim 9, wherein the lane divider body further comprises a reinforcing wall extending between the top wall and bottom wall to form at least two transverse openings through the lane divider body.

12. A battery formation table, comprising:
    a conveyor belt comprising plurality of hingedly connected conveyor belt modules forming a circuit comprising a carryway extending from an infeed to an outfeed and a returnway below the carryway;
    a tank surrounding the conveyor belt so that the carryway can be submerged in a cooling fluid;
    a plurality of lane dividers inserted every other row of the conveyor belt to divide the carryway into a plurality of lanes, each lane divider including a hinge element extending from a body for connecting the lane divider to the conveyor belt and a transverse opening through the body for allowing transverse fluid flow.

13. The battery formation table of claim 12, the lane dividers have front edges that are is aligned with openings in the lane divider hinge element and openings in hinge elements in the conveyor belt.

14. The battery formation table of claim 12, wherein each lane divider body comprises a top wall extending from a top wall front edge to a top wall rear edge, a bottom wall extending from a bottom wall front edge to a bottom wall rear edge, a front wall extending from the top wall front edge to the bottom wall front edge and a rear wall extending between the top wall rear edge and the bottom wall rear edge.

15. The battery formation table of claim 14, wherein each lane divider body further comprises a reinforcing wall extending between the top wall and bottom wall to form at least two transverse openings through the lane divider body.

16. The battery formation table of claim 14, wherein each front wall comprises a first top curved wall extending forward and down from the top wall front edge, the first top curved wall transitioning to a forwardly angled wall, the forwardly angled wall transitioning to a lower angled wall that angles inward towards the bottom wall.

17. A lane divider for a conveyor belt comprising:
    a body comprising a top wall extending from a top wall front edge to a top wall rear edge, a bottom wall extending from a bottom wall front edge to a bottom wall rear edge, a front wall comprising a first top curved wall extending from the top wall front edge and transitioning to a forwardly angled wall, the forwardly angled wall transitioning to a lower angled wall that angles inward to the bottom wall front edge and a rear wall extending between the top wall rear edge and the bottom wall rear edge, the body including at least one transverse opening to allow fluid flow therethrough;
    a first hinge element extending downwards and forward from the front edge of the body for connecting the lane divider to a conveyor belt module; and a second hinge element extending downwards and rearward from the rear edge of the body for connecting the lane divider to a conveyor belt module.

18. A lane divider for a conveyor belt comprising:

a body comprising a top wall extending from a top wall front edge to a top wall rear edge, a bottom wall extending from a bottom wall front edge to a bottom wall rear edge, a front wall extending from the top wall front edge to the bottom wall front edge and a rear wall extending between the top wall rear edge and the bottom wall rear edge and a reinforcing wall extending between the top wall and bottom wall to form at least two transverse openings through the lane divider body;

a first hinge element extending downwards and forward from the front edge of the body for connecting the lane divider to a conveyor belt module; and a second hinge element extending downwards and rearward from the rear edge of the body for connecting the lane divider to a conveyor belt module.

\* \* \* \* \*